(12) United States Patent
Ghosh et al.

(10) Patent No.: US 9,736,984 B2
(45) Date of Patent: Aug. 22, 2017

(54) DEVICE FOR SEAWEED HARVESTING

(71) Applicant: COUNCIL OF SCIENTIFIC & INDUSTRIAL RESEARCH, New Delhi (IN)

(72) Inventors: Pushpito Kumar Ghosh, Gujarat (IN); Vaibhav Ajit Mantri, Gujarat (IN); Jayanta Kumar Pothal, Gujarat (IN); Veeraprakasam Veeragurunathan, Gujarat (IN); Sangaiya Thiruppathi, Gujarat (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 15/023,728

(22) PCT Filed: Dec. 8, 2014

(86) PCT No.: PCT/IN2014/050004
§ 371 (c)(1),
(2) Date: Mar. 22, 2016

(87) PCT Pub. No.: WO2015/087356
PCT Pub. Date: Jun. 18, 2015

(65) Prior Publication Data
US 2016/0270292 A1 Sep. 22, 2016

(30) Foreign Application Priority Data

Dec. 9, 2013 (IN) ............ 3567/DEL/2013

(51) Int. Cl.
*A01D 44/00* (2006.01)
*A01D 33/00* (2006.01)
*A01D 44/02* (2006.01)

(52) U.S. Cl.
CPC ............ *A01D 44/00* (2013.01); *A01D 33/00* (2013.01); *A01D 44/02* (2013.01)

(58) Field of Classification Search
CPC ......... A01D 44/00; A01D 44/02; A01G 33/00
See application file for complete search history.

(56) References Cited

U.S. PATENT DOCUMENTS 1,704,427 A * 3/1929 Coggins ................. A23N 15/10
460/131
2,524,519 A * 10/1950 Daub ..................... A23N 15/10
209/352

(Continued)

FOREIGN PATENT DOCUMENTS

EP 2266384 A1 12/2010
FR 2953230 A1 6/2011

(Continued)

OTHER PUBLICATIONS

Hayashi et al., "A Review of Kappaphycus Farming: Prospects and Constraints", pp. 225-283.

*Primary Examiner* — Arpad Fabian-Kovacs
(74) *Attorney, Agent, or Firm* — Baker and Hostetler LLP

(57) ABSTRACT

The application describes a system for harvesting seaweed. The system includes a frame structure (202) and a first device mounted (204,206) on the frame structure. The first device receives a tube net comprising the seaweed and selectively separates its apical tips protruding out of the tube net. The systems also includes a second device (212,214) mounted on the frame structure for receiving the tube net comprising partially harvested seaweed.

9 Claims, 3 Drawing Sheets

(56) References Cited

U.S. PATENT DOCUMENTS

| | | | | |
|---|---|---|---|---|
| 2,858,863 A * | 11/1958 | Lorenzen | ............... | A23N 4/22 |
| | | | | 83/364 |
| 4,040,344 A * | 8/1977 | Moore | ................ | A01F 29/10 |
| | | | | 100/171 |
| 4,333,263 A * | 6/1982 | Adey | ................ | A01K 63/04 |
| | | | | 210/602 |
| 7,958,705 B1 * | 6/2011 | Bourque | ............. | A01D 44/00 |
| | | | | 56/8 |
| 8,056,308 B2 * | 11/2011 | Shonnard | ............ | A01D 44/00 |
| | | | | 56/8 |
| 2002/0034817 A1 | 3/2002 | Henry et al. | | |
| 2012/0198761 A1 * | 8/2012 | Cooke | ................ | A01G 33/00 |
| | | | | 47/1.4 |
| 2016/0219811 A1 * | 8/2016 | Kati | .................. | A01D 44/00 |
| 2016/0288027 A1 * | 10/2016 | Choi | ................... | C02F 1/004 |

FOREIGN PATENT DOCUMENTS

| | | | | | |
|---|---|---|---|---|---|
| JP | 03254605 A | * | 11/1991 | ............ | A01D 44/00 |
| JP | 05176619 A | * | 7/1993 | ............ | A01D 44/00 |
| JP | 0870673 A | | 3/1996 | | |
| JP | 09308352 A | * | 12/1997 | ............ | A01D 44/02 |
| JP | 10094344 A | * | 4/1998 | ............ | A01K 75/00 |
| JP | 10295336 A | | 11/1998 | | |
| JP | 2000023535 A | * | 1/2000 | ............ | A01D 44/02 |
| JP | 2008199903 A | * | 9/2008 | ............ | A01G 33/02 |
| JP | 3146890 U | * | 12/2008 | ............ | B08B 1/04 |

\* cited by examiner

DEVICE FOR SEAWEED HARVESTING

CROSS REFERENCE TO RELATED APPLICATIONS

This application is a National Stage of International Application No. PCT/IN2014/050004, filed on Dec. 8, 2014, which claims priority to Indian patent application no. 3567/DEL/2013, filed on Dec. 9, 2013, the disclosures of which are incorporated by reference in their entirety.

FIELD OF INVENTION

The present invention relates to designing a system for harvesting of seaweeds. Still more particularly, the invention relates to a device for simultaneously harvesting and segregating quality material for seeding as well as for processing in inexpensive manner utilizing the cultivated seaweed material from tube-nets.

PRIOR ART

The commercial seaweed hydrocolloids constitute three important polysaccharides namely, carrageenan, agar and alginate. The food processing industry continues to be the primary market utilizing seaweed hydrocolloids as texturing or thickening agent. The seaweed hydrocolloid market, however, is highly dependent on raw material availability which is met through artificial cultivation. Recently, global seaweed market witnessed escalated raw material cost as demand has outstripped supply. Although, focused efforts have been made inventing newer applications for seaweed hydrocolloids, only a smattering of attempts have addressed techniques for seeding and harvesting of large-scale commercial farming.

The commercial farming of red seaweed is centered on South Asian countries. The large scale cultivation of *Kappaphycus* alone is estimated to produce 450,000 ton dry weight year$^{-1}$ in the Brunei—Indonesia—Malaysia—Philippines (East Association of Southeast Asian Nations) Growth Area in the current decade. Several farming techniques have evolved over the time since first successful cultivation of *Kappaphycus* that has been attempted in Philippines in early 1970s. The farming techniques such as fixed off-bottom, floating bamboo raft, cages, hanging long line, fixed monocline etc have been successfully practiced. The daily growth rate (determining production of raw material) varied widely depending upon the cultivation method. The currently practiced commercial cultivation of red seaweeds in general and more precisely in *K. alvarezii* relies on tying of vegetative fragments to long-line using method referred to tie-tie technique.

The tie-tie method is cumbersome and labor intensive. Moreover, high maintenance coast associated with drifting of fragments due to high wave action reduces the biomass yield considerably, if cultivated in open sea. An alternative method known as tube-net method is now employed in *K. alvarezii, Gracilaria edulis* and *Gracilaria salicornia* cultivation.

It has been scientifically proved that quality and quantity of hydrocolloid is influenced by maturity of the thallus. The young apical tips offer excellent seed for propagation due to high percentage of meristematic tissue, while older thallus (basal portion) yields copious amounts of sap (plant growth stimulant) along with phycocolloid. Furthermore, the continuous utilization of aged seed material deteriorates the growth in continuous farming due to infestation and fading of older tissue. Nevertheless, currently no viable practice is available, wherein cost effective seeding and harvesting by non-cumbersome method can be achieved for large scale commercial practice. The selective segregation of apical tips from mature thallus is also not been possible.

Thus, there has been a long felt need to provide a system for harvesting of cultivated seaweed which enables selective segregation of harvested biomass. The segregated apical parts may be used for further seeding and the plants remains in the tube net may be allowed to further growth or further commercial activities.

OBJECT OF THE INVENTION

The main object of the present invention is to make a device that can aid harvesting of commercially cultivated seaweed with cost effective manner.

Another object is to design the device that can simultaneously segregate quality material for seeding as well as product rich tissue in inexpensive manner.

SUMMARY OF THE INVENTION

Keeping the above object in mind, the present invention provides a system for harvesting seaweed, said device comprising: a frame structure; a first device mounted on the frame structure, the first device being adapted to receive a tube net comprising the seaweeds and selectively separate therefrom apical tips of the seaweed protruding out of the tube net; and a second device mounted on the frame structure for receiving the tube net comprising partially harvested seaweed and harvesting therefrom a remaining part of the seaweed.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present invention will become better understood when the following detailed description is read with reference to the accompanying drawings in which like characters represent like parts throughout the drawings, wherein.

Figure 1:
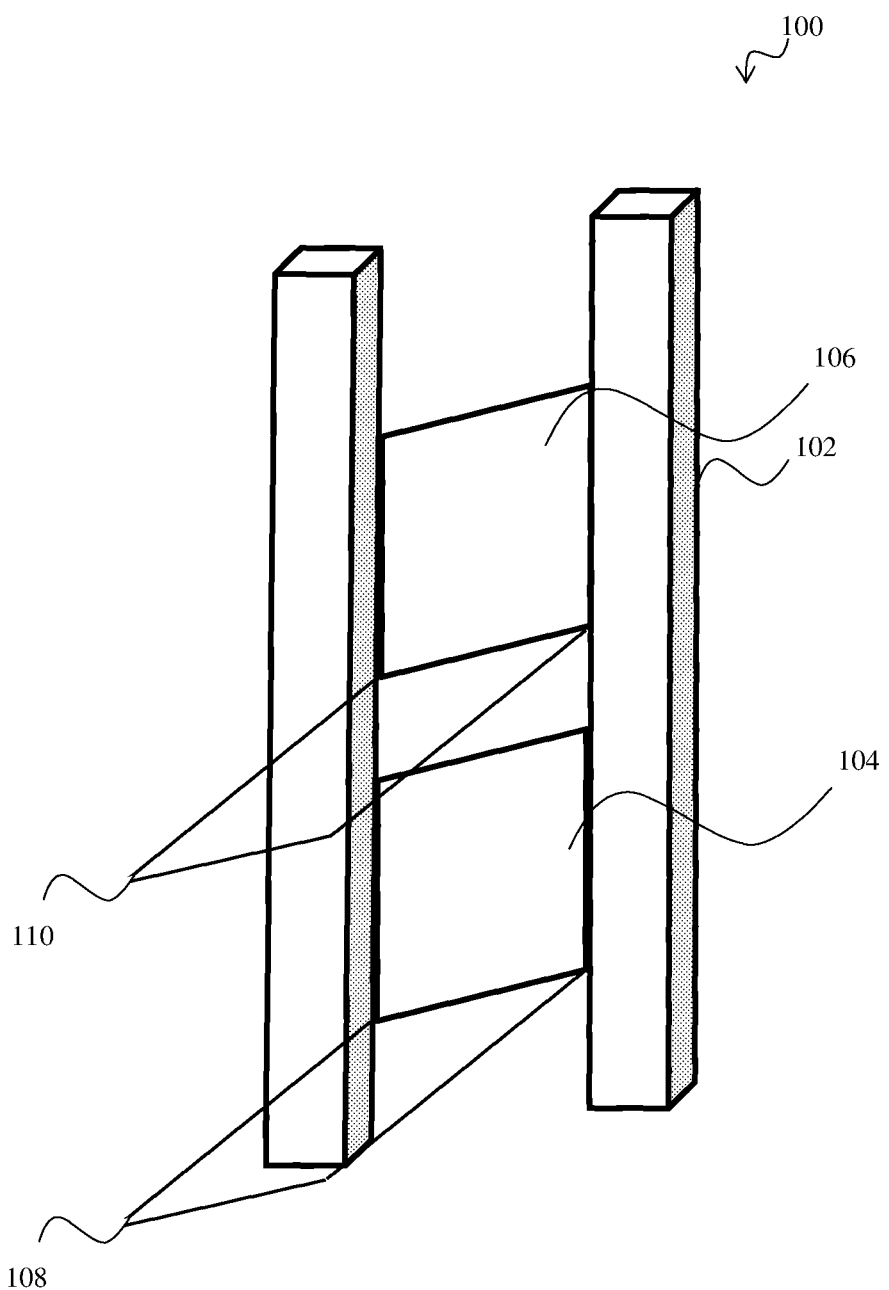
FIG. 1 illustrates a block diagram of the system in accordance with one embodiment of the present invention.

Further, skilled artisans will appreciate that elements in the drawings are illustrated for simplicity and may not represent all the elements which may be included in the system. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system and examples provided herein are illustrative only and not intended to be limiting.

Embodiments of the present invention will be described below in detail with reference to the accompanying drawings.

The harvesting of seaweed in traditional method does not allow segregation of product rich (SAP and hydrocolloid) older thallus from meristematic apical tips. The apical tips are free from epiphytic infestation and restore vigour, thus serves as excellent seed material. The selective use of such material for seeding helps in maintaining daily growth rate constant. The device has been designed to make selective harvesting. The tube nets of various sizes are being used for cultivating seaweeds, where the new growing tips coming out from the mesh can be subjected to harvesting after 45 days growth cycle.

Now referring to FIG. 1, there is provided a system (110) for harvesting seaweed, said system comprising:

a frame structure (102);

a first device (104) mounted on the frame structure (102), the first device (104) being adapted to receive a tube net (not shown) comprising the seaweeds and selectively separate therefrom apical tips of the seaweed protruding out of the tube net; and a second device (106) mounted on the frame structure (102) for receiving the tube net comprising partially harvested seaweed and harvesting therefrom a remaining part of the seaweed.

In an embodiment of the present invention, the system (100) further comprises a first receiving means (108) for receiving harvested apical tips of the seaweed from the first device (104).

In another embodiment of the present invention, the system (100) further comprises a second receiving means (110) for receiving a remaining part of the seaweed from the second device (106).

In a furthermore embodiment of the present invention, wherein the second device comprises a crushing device.

In another embodiment of the present invention, the crushing element comprises a first cylindrical member supported in proximity of a second cylindrical member such that the external surface of the cylinders face each other and define a recess there between.

In yet another embodiment of the present invention, the first cylindrical member is provided with a motion imparting means.

In still another embodiment of the present invention, at least one of the first or the second cylindrical member is provided with a recess adjusting mechanism.

Figure 2:
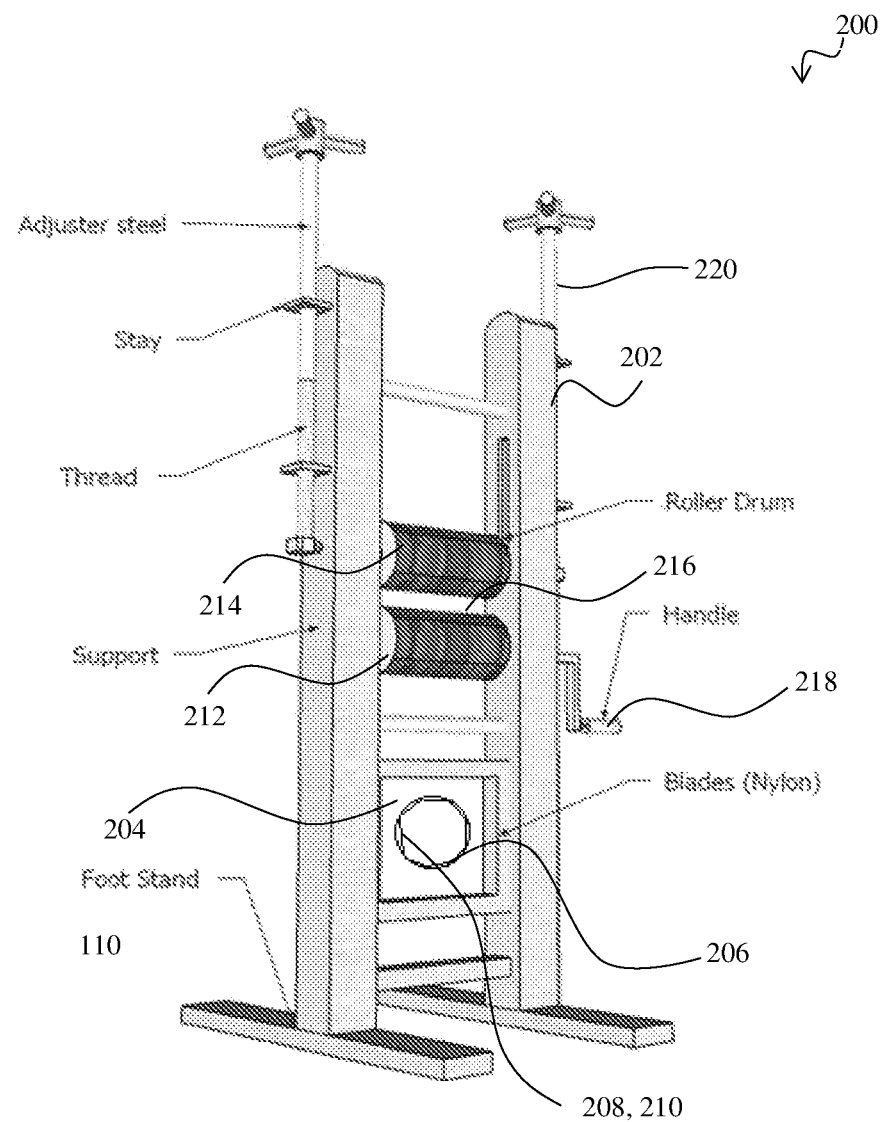
FIG. 2 shows a perspective view of a sample system constructed in accordance with one embodiment of the present invention.

Now referring to FIG. 2 a more detailed construction view of a sample system (200) or harvesting seaweed is shown and it can be seen that the system (200) comprises: a frame structure (202); a panel (204) mounted on the frame structure (202) at a first elevation, the panel (204) defining an aperture (206) and plurality of string member (208) attached across the aperture (206) to define a predetermined geometric figure (210), wherein the plurality of string members (208) are adapted to come in contact with apical tips of the seaweed protruding out of a tube-net and separate the same from a remaining part of the seaweed; a first cylindrical member (212) mounted on the frame structure (202) at a second elevation; a second cylindrical member (214) coupled to the frame structure (202) at a third elevation such that the external surfaces of the first and the second cylinders face each other and define a recess (216) there between; a motion imparting means (218) the coupled to the first cylindrical member (212); and a recess adjusting mechanism (220) coupled to the frame structure (202) and the second cylindrical member (214) for adjusting the recess (216) between the first and the second cylindrical members; the first and the second cylindrical members (212, 214) receiving the tube net comprising partially harvested seaweed and harvesting therefrom a remaining part of the seaweed.

Figure 3:
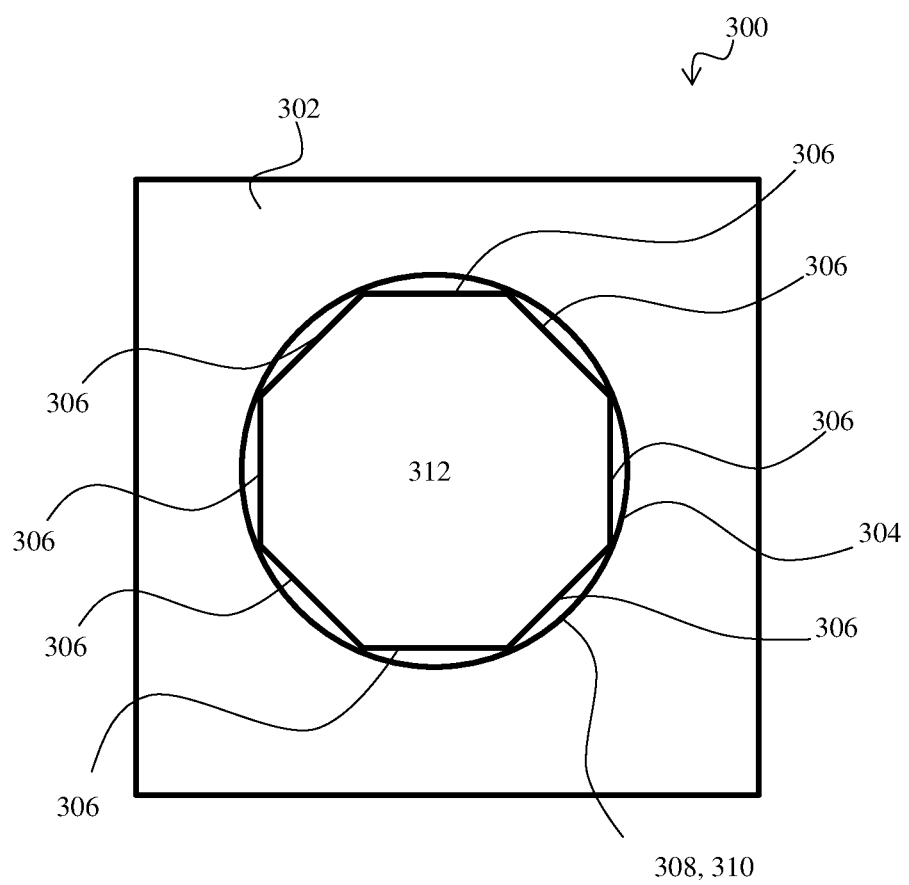
FIG. 3 illustrates a closer view of the first device in accordance with one embodiment of the present invention.

As illustrated in FIG. 3, an elaborate view of the first device is shown and the same comprises a panel (302) defining an aperture (304) and plurality of string member (306) attached across the aperture (304) to define a predetermined geometric figure (308), wherein the plurality of string members are adapted to come in contact with the apical tips of the seaweed protruding out of the tube net and separate the same from a remaining part of the seaweed.

In still another embodiment of the present invention, the plurality of string members (306) are attached to define a polygonal shape (310) with a central hollow portion (312).

In a further another embodiment of the present invention, eight string members are attached to define an octagonal shape with a central hollow portion.

The use of string members allows easy passage of tubes even with slight variation in diameter. It also provides effective control of harvesting. Preferably the string members can be made of high tension plastic strings, which automatically eliminate corrosion and add on durability. The string members yields 36.72% average harvesting of apical tips in red alga Gracilaria salicornia; 55.36% average harvesting of apical tips in Gracilaria edulis. In other part of machine two wooden rolling cylinders have been placed with just 1 cm recess, which can be adjusted. Ridges and furrows are marked on the entire circumference of the rolling cylinders to create adequate friction during the crushing process. A handle has been fixed at one side to give momentum to the rollers. The tube nets which have been partially harvested (for apical tips) were then passed through this rolling cylinder to achieve complete harvesting of the algae, leaving behind the empty tubes for reseeding. The second step effectively harvested remaining 60.36% biomass; with loss of 2.92% during processing; while it was 39.80% biomass, with loss of 4.84% during processing in Gracilaria edulis.

Some of the advantages of the invention are as follows:

1. Developing sustainable and standalone method that allows simultaneous segregation of quality material for seeding (apical tips) as well as product rich older thallus in inexpensive manner utilizing the cultivated seaweed.

2. Ensuring cost-effectiveness of the device so that it is affordable to the seaweed grower.

While specific language has been used to describe the disclosure, any limitations arising on account of the same are not intended. As would be apparent to a person in the art, various working modifications may be made to the system in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A system for harvesting seaweed, said system comprising:
   a frame structure;
   a panel defining an aperture and mounted on the frame structure, the panel being adapted to receive a tube net comprising the seaweed and the panel comprises a plurality of string members attached across the aperture to define a predetermined geometric figure, wherein the plurality of string members are adapted to come in contact with apical tips of the seaweed protruding out of the tube net and separate the same from a remaining part of the seaweed to thereby provide the tube net comprising partially harvested seaweed; and
   a crushing device mounted on the frame structure for receiving the tube net comprising partially harvested seaweed and crushing the partially harvested seaweed to provide harvested seaweed.

2. The system for harvesting seaweed as claimed in claim 1, further comprising a first receiving means for receiving the apical tips from the panel.

3. The system for harvesting seaweed as claimed in claim 1, further comprising a second receiving means for receiving a remaining part of the seaweed from the crushing device.

4. The system for harvesting seaweed as claimed in claim 1, wherein the plurality of string members are attached to define a polygonal shape with a central hollow portion.

5. The system for harvesting seaweed as claimed in claim 1, wherein eight string members are attached to define an octagonal shape with a central hollow portion.

6. The system for harvesting seaweed as claimed in claim 4, wherein the crushing device comprises a first cylindrical member supported in proximity of a second cylindrical member such that the external surface of the cylinders face each other and define a recess there between.

7. The system for harvesting seaweed as claimed in claim 5, wherein the first cylindrical member is provided with a motion imparting means.

8. The system for harvesting seaweed as claimed in claim 5, wherein at least one of the first or the second cylindrical member is provided with a recess adjusting mechanism.

9. A system for harvesting seaweed, said system comprising:
   a frame structure;
   a panel mounted on the frame structure at a first elevation, the panel defining an aperture and plurality of string members attached across the aperture to define a predetermined geometric figure, wherein the plurality of string members are adapted to come in contact with apical tips of the seaweed protruding out of a tube-net and separate the same from a remaining part of the seaweed to thereby provide the tube net comprising partially harvested seaweed;
   a first cylindrical member mounted on the frame structure at a second elevation;
   a second cylindrical member coupled to the frame structure at a third elevation such that the external surfaces of the first and the second cylinders face each other and define a recess there between;
   a motion imparting means coupled to the first cylindrical member; and
   a recess adjusting mechanism coupled to the frame structure and the second cylindrical member for adjusting the recess between the first and the second cylindrical members;
   the first and the second cylindrical members receiving the tube net comprising partially harvested seaweed and crushing the partially harvested seaweed to provide harvested seaweed.

* * * * *